J. R. FRENCH.
MILLING MACHINE ATTACHMENT.
APPLICATION FILED MAY 4, 1909.
953,904.
Patented Apr. 5, 1910.
2 SHEETS—SHEET 2.
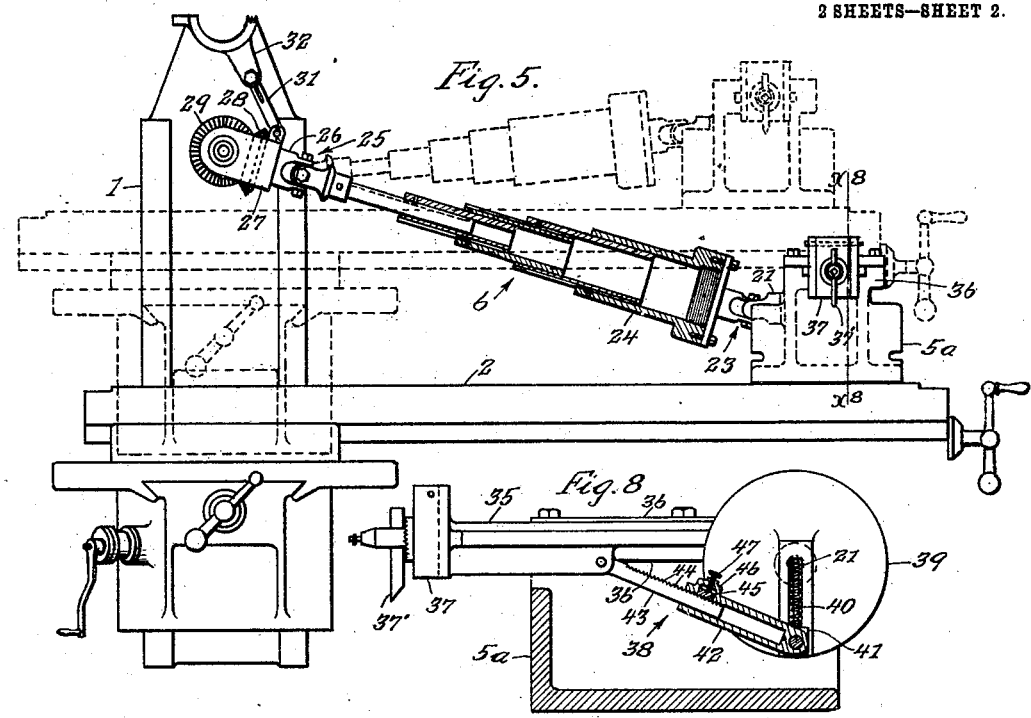
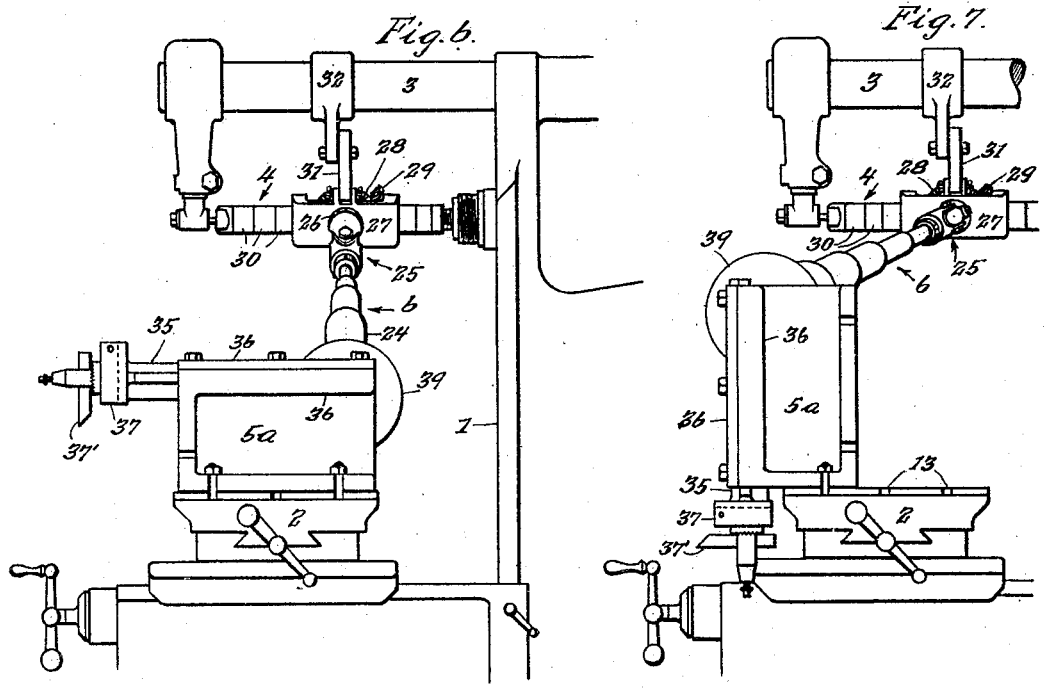
Witnesses.
Geo. J. Huting.
Louis W. Gratz.
Inventor:
John R. French.
by Townsend Hauxhackley
Atty.

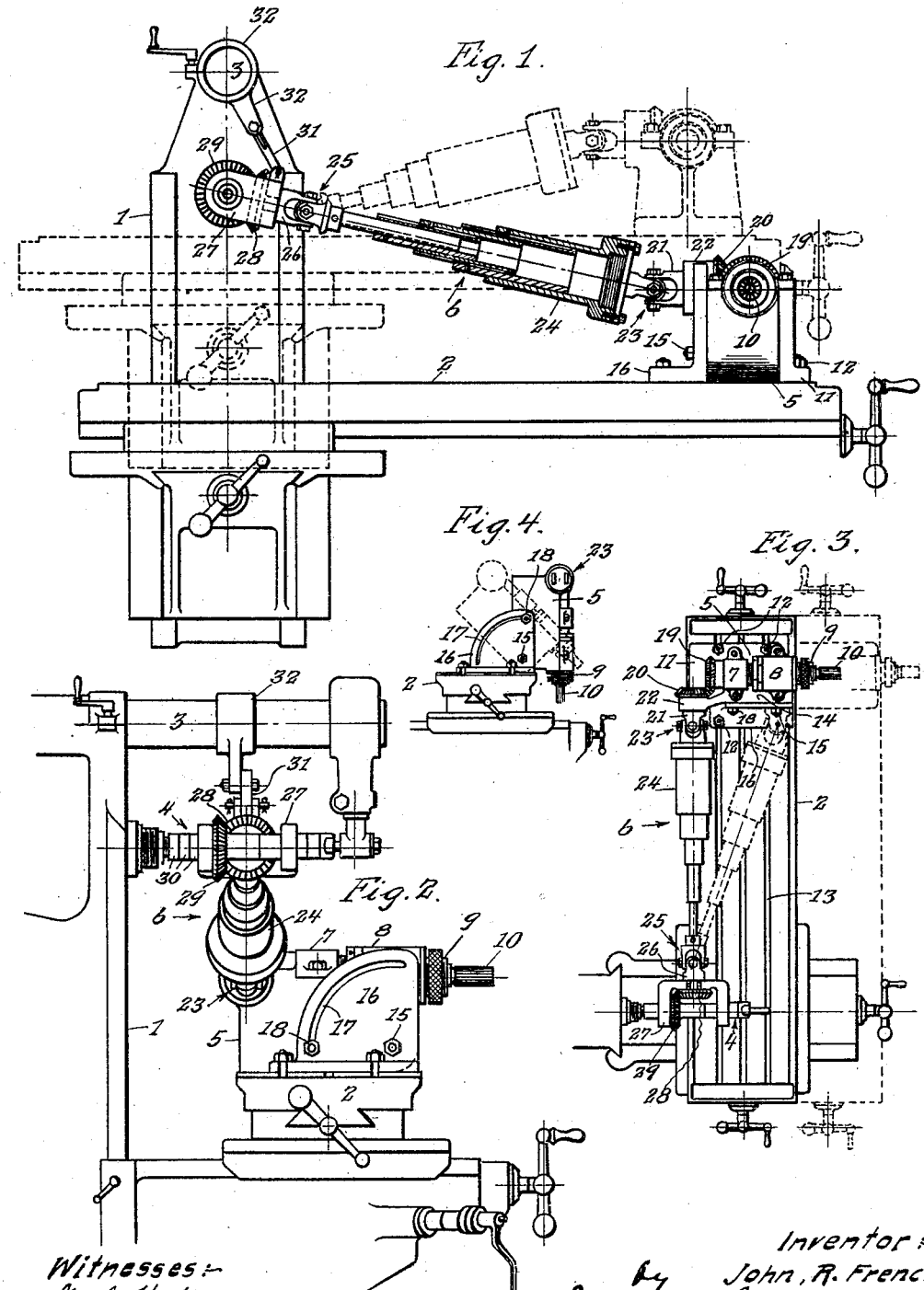

UNITED STATES PATENT OFFICE.

JOHN R. FRENCH, OF LOS ANGELES, CALIFORNIA.

MILLING-MACHINE ATTACHMENT.

953,904.  Specification of Letters Patent.  Patented Apr. 5, 1910.

Application filed May 4, 1909. Serial No. 493,972.

*To all whom it may concern:*

Be it known that I, JOHN R. FRENCH, a citizen of the United States, residing at Los Angeles, in the county of Los Angeles and State of California, have invented a new and useful Milling-Machine Attachment, of which the following is a specification.

This invention relates to an attachment for a milling machine, and the object of the invention is to provide an attachment which is adapted to be applied to a milling machine, said attachment to be mounted on the table of the milling machine and being provided with a tool, either rotary or reciprocatory, and driven by the milling machine, whereby the position of said tool may be moved or adjusted by adjusting the table manually or operating it automatically, or by adjusting the attachment into various positions on the table of the milling machine. This provides a power driven tool which may be bodily moved in all directions and angles, and enables a piece of work to be machined by standing the work in a position adjacent to the milling machine and tool, the work remaining stationary while the tool travels in cutting, and thus work which is too heavy to be mounted upon the table of the milling machine or which is of such peculiar shape that it cannot be mounted on the table of the milling machine may be machined by means of the attachment.

The tool which is operated by the attachment may be a rotating tool such as a milling cutter, or drill, or the tool may be reciprocatory such as employed in planers or shapers.

A further object of the invention is to enable the attachment to be quickly applied to the milling machine and tool, by so constructing the attachment that it may be applied to any milling machine of ordinary type without requiring any rebuilding or alteration of the milling machine, the milling attachment being capable of application to the milling machine in a few moments and being removable from the milling machine with equal ease and expedition, the milling machine being adapted for its regular work upon the removal of the attachment.

Other objects and advantages will be brought out in the following description.

The many operations of which the attachment is capable will readily be appreciated by those skilled in the art.

Referring to the drawings:—Figure 1 is a front elevation of the upper portion of a milling machine, showing the attachment as applied thereto, a portion of the telescopic driving shaft being in section. Dotted lines indicate the vertical and horizontal adjustment or movement of the attachment as effected by the regular table of the milling machine. Fig. 2 is a side elevation of the upper portion of the milling machine with the attachment applied. Fig. 3 is a plan view on a reduced scale, dotted lines indicating the transverse movement or adjustability of the attachment as afforded by the regular table of the milling machine. Fig. 4 is a side elevation of the auxiliary head on a reduced scale indicating the angular adjustment in a vertical plane of the auxiliary head and tool. Fig. 5 is a view similar to Fig. 1 showing the attachment equipped with the reciprocatory tool. Fig. 6 is a similar view to Fig. 2, showing the attachment for the reciprocatory tool. Fig. 7 is a view similar to Fig. 4, showing the attachment adjusted to produce a vertical movement of the reciprocatory tool. Fig. 8 is an enlarged section on line $x^8$—$x^8$ Fig. 5.

1 designates the frame of the machine with the usual table 2, the latter being capable of movement longitudinally, vertically, transversely, and angularly transversely, and being adjusted and driven by well known mechanisms, not necessary to describe in detail.

3 is the overhanging arm and 4 the regular spindle, the latter being driven by well known mechanism.

The attachment comprises an auxiliary head 5 which is attached to the table 2 and which is driven by an extensible connection, in this embodiment a telescopic shaft 6, which in turn is operated by gearing at the spindle 4. The auxiliary head 5 is formed with journals 7 and 8 in which is mounted an auxiliary spindle 9 which carries and operates a rotating tool 10 which may be a milling cutter of any design or a drill or reamer or other rotary tool. The base 11 of the auxiliary head 5 is slotted to receive bolts 12 which engage with T-slots 13 in the table 2 for securing the auxiliary head to the table when the spindle 9 is to operate horizontally. The auxiliary head 5 is also preferably provided with a side plate 14 which is pivoted at 15 to an angle plate 16, the latter being secured to the table 2, and having a slot 17 concentric with the pivot 15, a bolt 18 passing through the side plate 14 and slot 17 for securing the auxiliary head 5 at various angular positions afforded by the curved slot 17 and pivot 15. Fig. 4 illustrates the auxiliary head 5 adjusted with the spindle 9 vertical and indicates in dotted lines the adjustment of the auxiliary head to hold the spindle angularly.

The auxiliary spindle 9 is driven by a bevel gear 19 on the end thereof which meshes with a bevel gear 20 having a short shaft 21 mounted in a bearing 22 formed on the auxiliary head 5. The short shaft 21 is connected by a universal joint 23 with an end tube 24 of the telescopic shaft 6, the latter being of any preferred construction, and the other end of the telescopic shaft 6 being connected by a universal joint 25 with a short shaft 26 mounted in a yoke 27. The yoke 27 is supported on the regular spindle 4 so that the axis of shaft 26 intersects the axis of the spindle 4. A bevel gear 28 is arranged on the end of the shaft 26 inside of the yoke 27 and meshes with a bevel gear 29 fixed on the spindle 4. The yoke 27 is suitably positioned on the spindle 4 by bushing 30 and together with gear 29 is readily removable from the spindle 4. The gear 29 revolves with the spindle 4 while the spindle 4 freely revolves in the yoke 27 and the yoke 27 is prevented from turning by a slotted link 31 which is adjustably connected with a collar 32, which is slipped on the overhanging arm 3. Thus as the spindle 4 revolves, it imparts rotation through gears 29 and 28 to the telescopic shaft 6 which in turn through gears 20 and 19 drives the auxiliary spindle 9. The shaft 24 being telescopic, and being connected with the gearing at each end by the universal joints, permits the table 2 to be operated in any of its paths of movements or adjustments, while continuously driving the auxiliary spindles 9 and tool. Thus, while the tool 10 is being constantly rotated the table may be adjusted vertically, longitudinally, transversely, or angularly transversely, to adjust or feed the tool 10 accordingly. The work to be operated upon is placed in a position adjacent to the tool 10 and is set approximately in position, while the exact setting to secure the desired cut is performed by adjusting the table 2. Thus, it is possible to secure as accurate adjustment, as when the work is mounted on the table 2 in the ordinary way. If it be desired to operate the tool vertically, the auxiliary head 5 is adjusted on its pivot 15 and secured by bolt 18 as shown in Fig. 4, or as indicated in Fig. 4 it may be set at any angle. The longitudinal feed or adjustment of the tool is in this embodiment obviously limited to the longitudinal amount of adjustment permitted by the telescopic shaft 6. But such adjustability of the telescopic shaft is considerable and ample for practically all work in which the attachment is applicable. The transverse and vertical adjustments are obviously coextensive with the table 2, the longitudinal movement only being restricted.

In Figs. 5 to 8 inclusive, the auxiliary head $5^a$ is equipped for operating a reciprocatory tool, the other parts of the attachment being unchanged. A slide 35 is mounted to reciprocate on ways 36 formed on the auxiliary head $5^a$ and the other end of the slide 35 carries a clapper box 37 with tool 37'. The slide 35 is operated by an adjustable connecting rod 38 which is driven from a disk 39 which is mounted on shaft 21 in lieu of the bevel gear 20. The disk 39 has a radial screw 40 for adjusting a block 41 to which one end of the connecting rod 38 is pivoted, so that by turning screw 40, the stroke of the slide 35 may be varied. The connecting rod 38 is made adjustable in length so as to adjust the range of the stroke of the tool. The connecting rod 38 may be constructed in any desirable manner, as for example, with a socket member 42 which receives an inner rod 43, one edge of which has fine V-teeth 44 which are clamped by a plate 45 having similar V-teeth and being confined against movement longitudinally in a box 46, pressure of the block 45 against teeth 44 being produced by thumb screw 47. This construction enables quick and fine adjustment of the length of the connecting rod 38 to position the range of the tool 37' while the length of stroke of the tool 37' is adjusted by means of screw 40. The shaft 21 is driven as in the previously described manner and when the attachment is secured to the table 2 as shown in Figs. 5 and 6, the tool travels horizontally and operates on the work, the work having been set in proximity to the milling machine as previously described for the rotating tool. If it be desired to operate the tool vertically, the auxiliary head $5^a$ may be tipped on end as shown in Fig. 7. It is obvious that the work area of the reciprocatory tool is determined by the various adjustments of the table 2 as in the case of the rotating tool. The auxiliary heads 5 and $5^a$ are interchangeable with each other, the connection of either one with the driving part of the attachment being made at the universal joint 23.

What I claim is:—

1. In a milling machine, in combination with its spindle and adjustable table, an auxiliary head on the table of the machine, a tool and tool operating means in the auxiliary head, and means for driving the tool operating means and tool from said spindle, and means for moving the table, auxiliary head, tool operating means, and tool bodily while the tool is being driven.

2. In a milling machine, in combination with its spindle and table, an auxiliary head on the table, a tool in the auxiliary head, and an adjustable connection between the spindle and tool for driving the tool and permitting the table, auxiliary head, and tool to be moved bodily into various positions, without interfering with the driving of the tool.

3. In a milling machine, in combination with its spindle and adjustable table, an auxiliary head on the table, a tool carried by the auxiliary head, means for moving the table and adjustable means between the spindle and auxiliary head for driving the tool and permitting movement of the table, auxiliary head, and tool.

4. In a milling machine, in combination with its spindle and table, means for moving the table, an auxiliary head on the table, a spindle and tool in the auxiliary head, a telescopic connection intermediate the auxiliary head and said first spindle for driving the tool and permitting bodily movement of the tool with the table, and bevel gearing at each end of the telescopic connection for driving the auxiliary spindle from the first spindle.

5. In a milling machine, in combination with its spindle and table, means for moving the table, an auxiliary head on the table, a spindle and tool in the auxiliary head, a telescopic connection intermediate the first spindle and auxiliary spindle for driving the tool and permitting bodily movement of the tool with the table, a bevel gear at each end of the telescopic connection, and bevel gears on the respective spindles meshing with the respective bevel gears on the telescopic connection.

6. In a milling machine, in combination with its spindle and table, means for moving the table, an auxiliary head on the table, a spindle and tool in the auxiliary head, a telescopic connection intermediate the first spindle and auxiliary spindle for driving the tool and permitting bodily movement of the tool with the table, a bevel gear at each end of the telescopic connection, bevel gears on the respective spindles meshing with the respective bevel gears on the telescopic connection, and a universal joint between each end of the telescopic connection and the adjacent bevel gear.

7. A milling machine attachment comprising an auxiliary head adapted to be applied to and moved by the adjustable table of the milling machine, tool operating means in the auxiliary head, an extensible connection for operating the tool operating means, and means for operatively connecting the extensible connection with the spindle of the milling machine to drive the extensible connection from the spindle.

8. A milling machine attachment comprising an auxiliary head adapted to be applied to the table of the milling machine, tool operating means in the auxiliary head, an extensible connection operatively connected with the tool operating means, a yoke adapted to be applied on the spindle of the milling machine, a bevel gear journaled on the yoke, a bevel gear on the spindle meshing with the gear on the yoke, and a universal joint between the latter bevel gear and the extensible connection.

9. A milling machine attachment comprising an auxiliary head adapted to be applied to the table of the milling machine, tool operating means in the auxiliary head, an extensible connection operatively connected with the tool operating means, a yoke adapted to be applied on the spindle of the milling machine, a bevel gear journaled on the yoke, a bevel gear on the spindle meshing with the gear on the yoke, a universal joint between the latter bevel gear and the extensible connection, and a link connected to the yoke and adapted to be secured to the overhanging arm of the milling machine.

10. A milling machine attachment comprising an auxiliary head, means for securing the auxiliary head in various angular positions to the table of the milling machine, tool operating means mounted in the auxiliary head, and means comprising a telescopic connection for driving the tool operating means from the spindle of the milling machine.

11. Means for mounting a tool on the movable table of a milling machine, means for moving the table and tool carried by it, means for driving the tool from the spindle of the milling machine, said last means being automatically adjustable to permit the table and tool to be moved into various positions, whereby its cutting action is uninterrupted.

12. In combination with the tool spindle of the milling machine and the movable work supporting table, and the means for moving the movable table into various positions with respect to the tool spindle, auxiliary tool holding means adapted to be secured to the said table in place of the usual work, a tool in said tool holding means, and means operated by the tool spindle for continuously driving the tool in the auxiliary tool support and permitting the table with tool to be moved without disturbing the cutting action of the tool.

13. The movable table of a milling machine, the spindle of the milling machine, a cutting tool carried bodily by the said movable table, means between the spindle and tool for imparting a cutting movement to the tool, and means for moving the table with the tool vertically and horizontally without disturbing the cutting movement of the tool, whereby the tool may have a continuous cutting action and at the same time be bodily moved with relation to the work to be operated upon.

In testimony whereof, I have hereunto set my hand at Los Angeles, California, this 24th day of April, 1909.

JOHN R. FRENCH.

In presence of—
G. T. HACKLEY,
FRANK L. A. GRAHAM.